(12) United States Patent
Ahn et al.

(10) Patent No.: US 7,255,478 B2
(45) Date of Patent: Aug. 14, 2007

(54) TRANSPORTING APPARATUS

(75) Inventors: Byung-il Ahn, Seoul (KR); Suk-won Lee, Kunpo-si (KR); Se-kyong Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 11/050,782

(22) Filed: Feb. 7, 2005

(65) Prior Publication Data

US 2005/0180666 A1 Aug. 18, 2005

(30) Foreign Application Priority Data

Feb. 13, 2004 (KR) .................... 10-2004-0009743

(51) Int. Cl.
*F16C 32/06* (2006.01)
(52) U.S. Cl. ..................................... 384/12
(58) Field of Classification Search ................. 384/12, 384/37, 38, 42, 8
See application file for complete search history.

(56) References Cited

U.S. PATENT DOCUMENTS 4,719,705 A * 1/1988 Laganza et al. ............. 384/12

FOREIGN PATENT DOCUMENTS

| JP | 11-166990 | 6/1999 |
|---|---|---|
| JP | 2002-57206 A | 2/2002 |
| JP | 2002-319538 A | 10/2002 |
| JP | 2003-194059 A | 7/2003 |
| KR | 10-283784 | 4/2001 |
| KR | 2001-106627 | 12/2001 |
| KR | 2003-95327 | 12/2003 |

OTHER PUBLICATIONS

Korean Office Action dated Nov. 17, 2005 issued for KR Patent Application No. 2004-9743.

* cited by examiner

*Primary Examiner*—Lenard A. Footland
(74) *Attorney, Agent, or Firm*—Stanzione & Kim, LLP

(57) ABSTRACT

A transporting apparatus which can horizontally transport a carrier using an air bearing of which a rotational degree of freedom is kept relative to a surface of a base. The transporting apparatus is movable along a surface of a base and includes an air bearing placed on a base, a connector connected to an upper part of the air bearing and provided with a supporter in a center thereof, the supporter having a flexure hinge structure to allow the air bearing to be freely rotated relative to the base, and the carrier supported by the supporter of the connector to be transported while keeping a level with respect to the surface of the base. With this configuration, a movement of the air bearing does not affect the carrier, thereby improving accuracy and reliability of the transporting apparatus.

20 Claims, 8 Drawing Sheets

TRANSPORTING APPARATUS

CROSS-REFERENCE TO RELATED APPLICATIONS

This application claims the benefit of Korean Patent Application No. 2004-9743, filed Feb. 13, 2004, in the Korean Intellectual Property Office, the disclosure of which is incorporated herein by reference.

BACKGROUND OF THE INVENTION

1. Field of the Invention

The present invention relates to a transporting apparatus, and more particularly, to a transporting apparatus which can horizontally transport a carrier with an air bearing of which a rotational degree of freedom is kept relative to a surface of a base.

2. Description of the Related Art

Generally, transporting machines used in various industry fields have been steadily developed with a high capacity, a small and lightweight structure (fine structure), and a high speed to achieve desired objects such as mass production, performance improvement, etc. Particularly, in a case of an apparatus for inspecting a semiconductor wafer, a liquid crystal display (LCD), etc., this apparatus is required to be excellent in cleanness, durability and accuracy, and accordingly requirements for introduction of an air bearing used with this apparatus are increasing.

The air bearing generates no friction due to a contact with a surface of a base, so that the air bearing can smoothly operate at a high speed with no noise. Further, the air bearing has a higher accuracy than other kinds of bearings and produces relatively less contaminant because the air bearing does not use oil as a lubricant. Such an air bearing is widely classified into a mass preload type, a magnet preload type and a vacuum preload type. Particularly, the vacuum preload type air bearing is being widely used because it is excellent not only in transport for a flat surface but also in accuracy.

As shown in FIG. 1, a conventional transporting apparatus for a precise component has a structure in which an air bearing 1 and a carrier 2 are firmly connected with each other through a connector 3. The connector 3 has a lower part shaped like a ball and movably coupled to the air bearing 1 by a retainer 4, and an upper part coupled to the carrier 2 by a fastening nut 5.

The air bearing 1 generates a thin layer of air using a pneumatic structure so that the carrier 2 and the air bearing 1 float on the thin layer of air at a predetermined distance from a surface of a base 6. At this time, if the base 6 has an irregular surface, the connector 3 has to keep a rotational degree of freedom of the air bearing 1 and a horizontal state of the carrier 2 on which the precise component are placed, thereby maintaining accuracy and reliability of the transporting apparatus. Further, the fastening nut 5 allows a height of the carrier 2 to be adjusted.

In a case that the conventional transporting apparatus employs the mass preload type or magnet preload type air bearing 1, a constant load weight vertically presses the connector 3, so that a minute gap between the connector 3 and the air bearing 1 is removed. Therefore, a space is not left between the connector 3 and the air bearing 1 even if the air bearing 1 goes through the irregular surface of the base 6, thereby keeping the horizontal state of the carrier 2.

In the meantime, in a case that the conventional transporting apparatus employs the vacuum preload type air bearing 1, contrary to the mass preload type or magnet preload type air bearing 1, a distance between the air bearing 1 and the surface of the base 6 is kept constant by discharging and inhaling air. Therefore, if the air bearing 1 goes through the irregular surface of the base 6, the space is left between the connector 3 and the air bearing 1 because of the minute gap between the connector 3 and the air bearing 1. Such space causes the carrier 2 to sway and incline, thereby decreasing the accuracy and the reliability of the transporting apparatus.

Further, in the conventional transporting apparatus, the connector 3 causes the carrier 2 to be positioned relatively higher than the surface of the base 6, thereby causing the accuracy and the reliability of the transporting apparatus to be decreased.

SUMMARY OF THE INVENTION

In order to solve the above-mentioned and/or other problems, it is an aspect of the general inventive concept to provide a transporting apparatus which can transport a carrier horizontally regardless of a movement of an air bearing and can lower a height of the carrier relative to a surface of a base.

Additional aspects and/or advantages of the general inventive concept will be set forth in part in the description which follows and, in part, will be obvious from the description, or may be learned by practice of the invention.

The foregoing and/or other aspects of the general inventive concept are achieved by providing a transporting apparatus movable along a surface of a base, the transporting apparatus including an air bearing placed on a base, a connector connected to an upper part of the air bearing and provided with a supporter at a center thereof, the supporter having a flexure hinge structure allowing the air bearing to be freely rotated relative to the base, and a carrier supported by the supporter of the connector and transported while keeping a level with respect to the surface of the base.

According to an aspect of the general inventive concept, the supporter of the connector may have the flexure hinge structure of a dual type and can include a first supporter and a second supporter which can be concentrically formed on the same surface.

According to another aspect of the general inventive concept, one of the first supporter of the connector and the carrier can be formed with a coupling protrusion and the other one of the first supporter of the connector and the carrier can be formed with a coupling hole corresponding to the coupling protrusion.

According to yet another aspect of the general inventive concept, the air bearing can be formed with a seating portion on which the connector can be placed, and the seating portion can be formed with an interference-preventing groove to allow the air bearing to be rotated without interfering with the supporter of the connector.

According to still another aspect of the general inventive concept, the air bearing may include a vacuum preload type air bearing.

According to still another aspect of the general inventive concept, the transporting apparatus may further include an actuator connected to the carrier to transport the carrier.

BRIEF DESCRIPTION OF THE DRAWINGS

These and other aspects and advantages of the general inventive concept will become apparent and more readily appreciated from the following description of the embodiments, taken in conjunction with the accompany drawings of which.

DETAIL DESCRIPTION OF THE INVENTION

Figure 1:
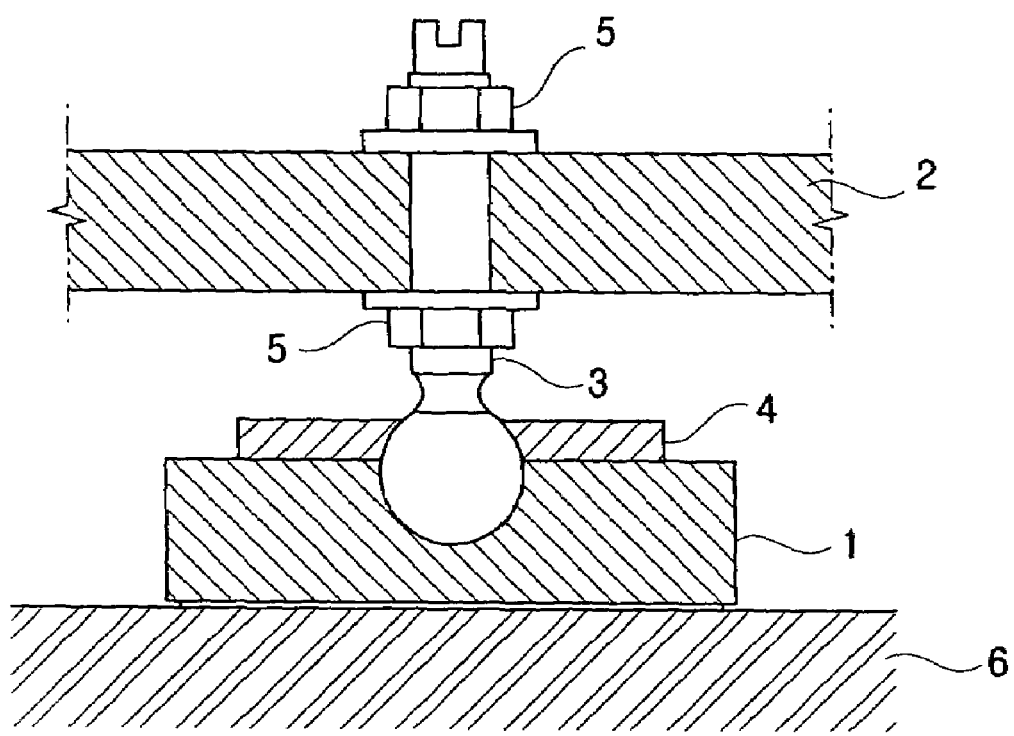
FIG. 1 is a sectional view of combination structure of a conventional transporting apparatus.
Figure 2:
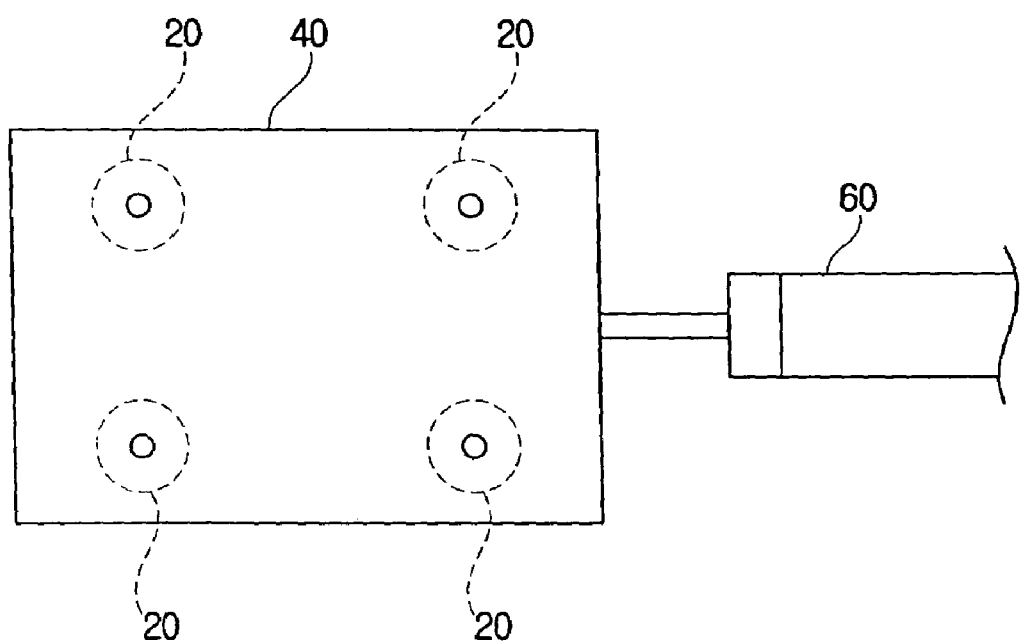
FIG. 2 is a schematic plan view illustrating the whole configuration of a transporting apparatus according to an embodiment of the general inventive concept.
Figure 3:
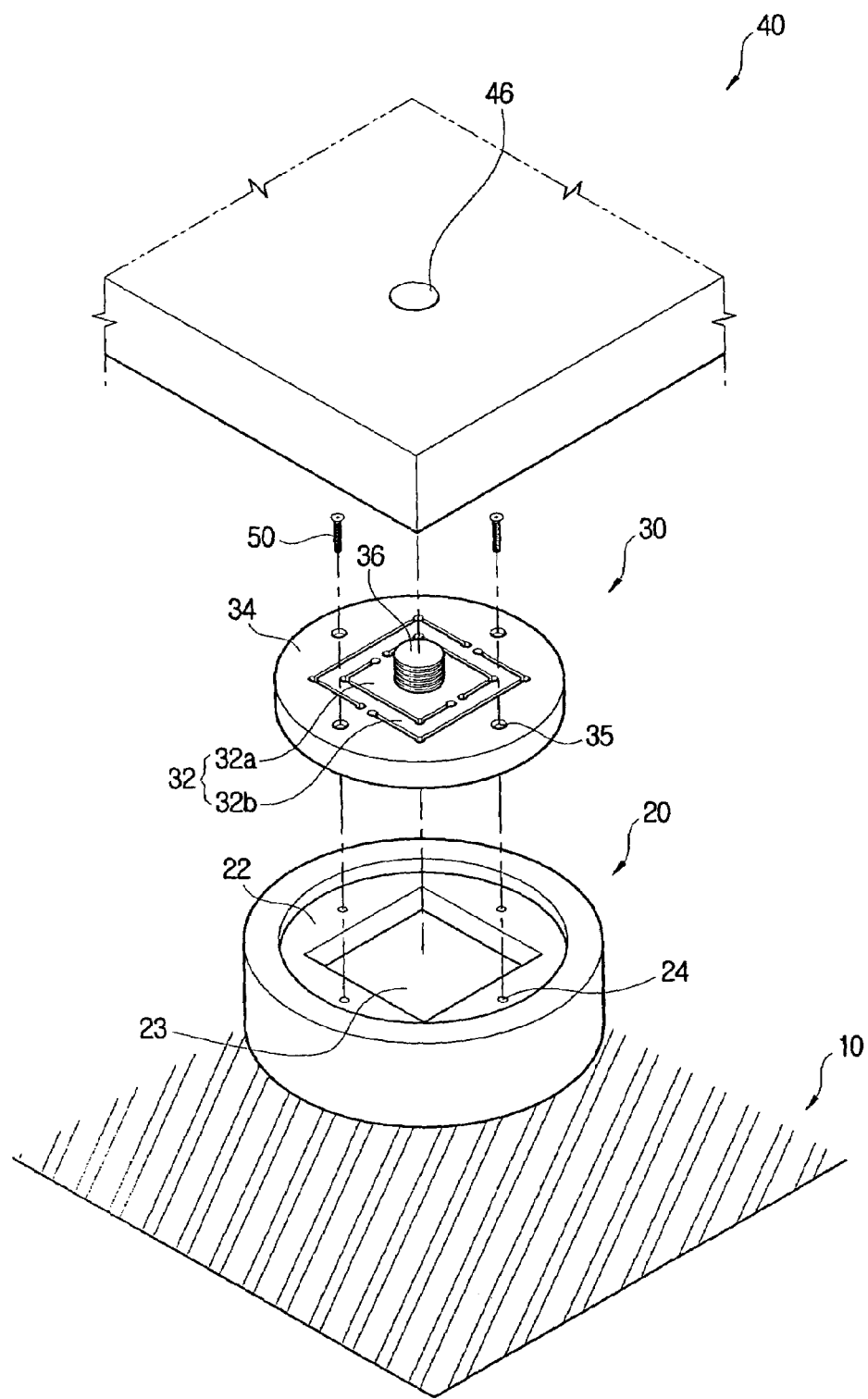
FIG. 3 is an exploded perspective view illustrating the transporting apparatus in FIG. 2.
Figure 4:
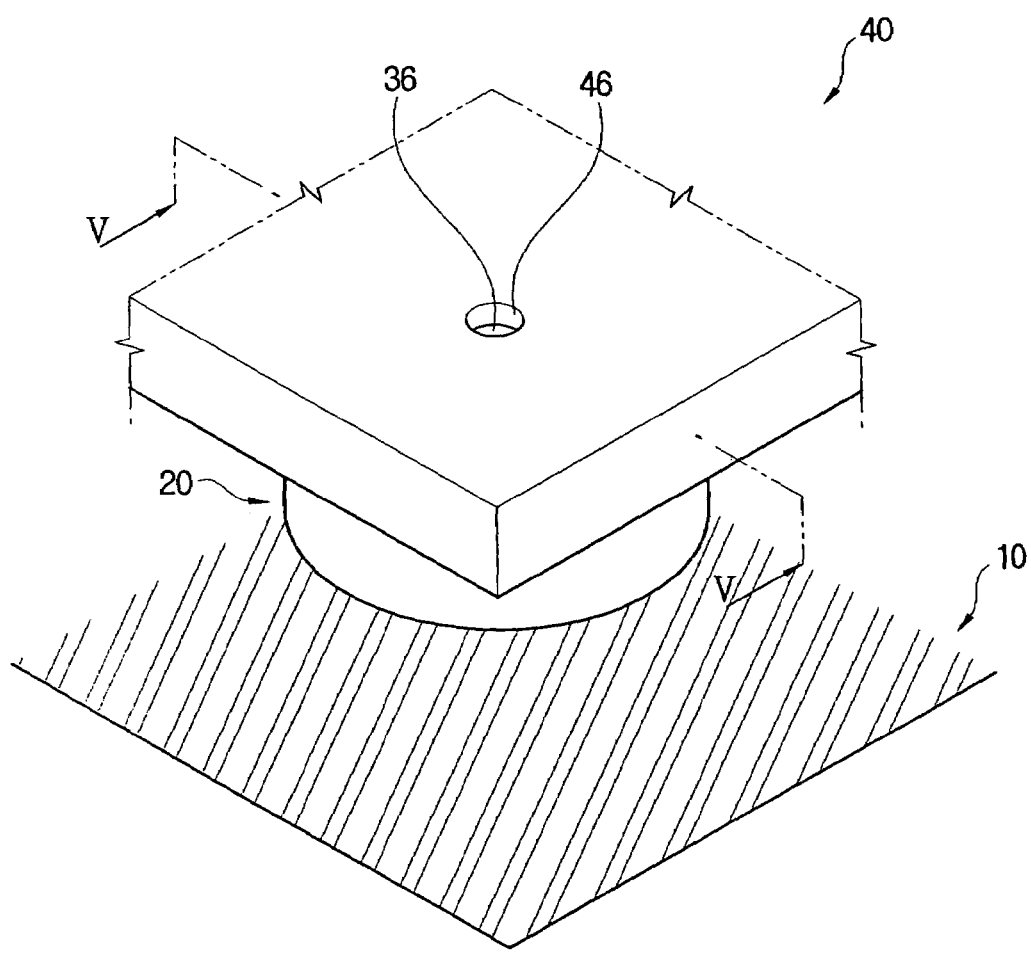
FIG. 4 is an assembled perspective view illustrating the transporting apparatus in FIG. 3.
Figure 5:
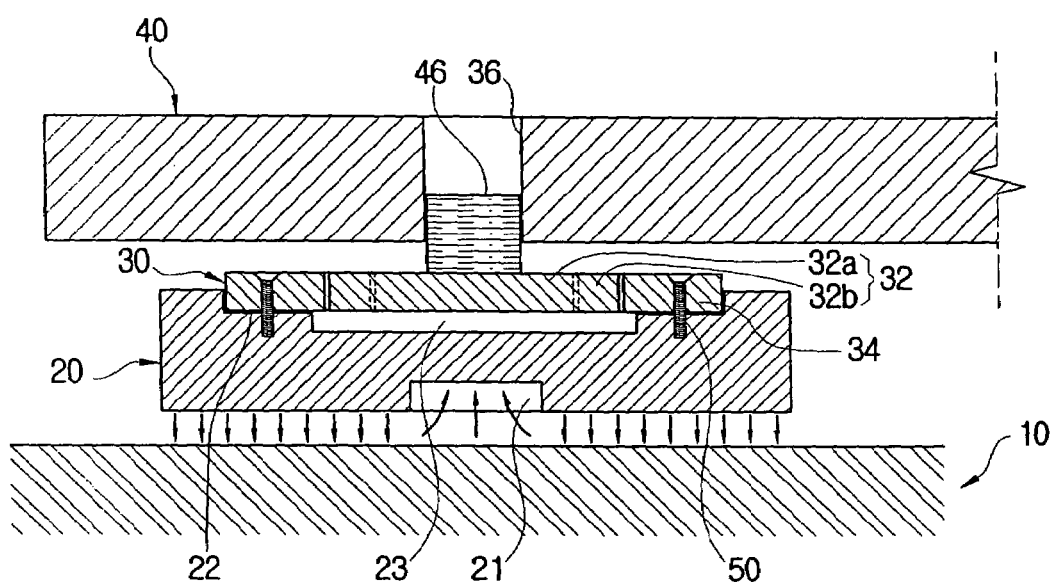
FIG. 5 is a sectional view illustrating the transporting apparatus taken along line V-V in FIG. 4.
Figure 6:
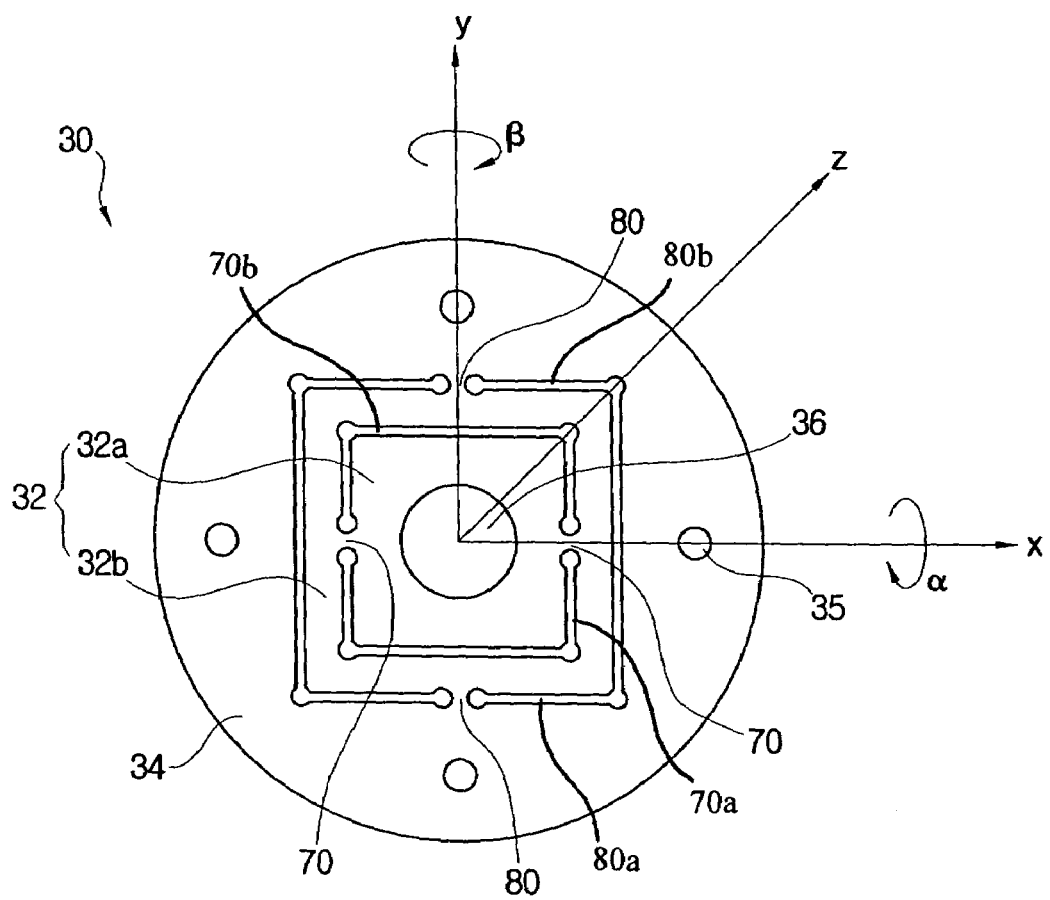
FIG. 6 is a plan view illustrating a connector of the transporting apparatus in FIG. 3.

Reference will now be made in detail to the embodiments of the general inventive concept, examples of which are illustrated in the accompanying drawings, wherein like reference numerals refer to like elements throughout. The embodiments are described below in order to explain the general inventive concept by referring to the figures.

As shown FIG. 2 through FIG. 6, a transporting apparatus according to an embodiment of the general inventive concept may include an air bearing 20 placed on a base 10, a connector 30 connected to an upper part of the air bearing 20 and provided with a supporter 32 in a center thereof, the supporter 32 having a flexure hinge structure allowing the air bearing 20 to be freely rotated relative to the base 10; and a carrier 40 supported by the supporter 32 of the connector 30 and transported with keeping level with respect to the surface of the base 10.

The base 10 may have an irregular surface due to foreign matters or faulty works, and if such an irregular surface affects the carrier 40, a horizontal state of the carrier 40 becomes unstable, thereby decreasing the accuracy and reliability of the transporting apparatus. Therefore,it is important that the irregular surface does not affect the carrier 40.

The air bearing 20 may be a pneumatic structure to generate air having a predetermined pressure and thus can move while floating over the base 10 by a predetermined distance from the surface of the base 20. Such an air bearing 20 can include well-known air bearings, but may include a vacuum preload type air bearing which is excellent not only in transport of a flat surface but also in accuracy.

In the vacuum preload type air bearing 20, contrary to a mass preload type air bearing or a magnet preload type air bearing, a distance between the air bearing 20 and the surface of the base 10 can be kept constant by discharging and inhaling air. Since the vacuum preload type air bearing 20 is well-known, a detailed description about its configuration and functions will be omitted.

In an aspect of the general inventive concept, the air bearing 20 can be made of a carbon material to evenly disperse and discharge the air supplied with a predetermined pressure, and can be formed with an air inlet 21 in a bottom thereof to inhale the air.

The air bearing 20 can be formed with a seating portion 22 on which the connector 30 can be placed, and a center of the seating portion 22 can be formed with an interference-preventing groove 23 to allow the air bearing 20 to be freely rotated without interfering with a supporter 32 of the connector 30. Further, the seating portion 22 can be formed with a screw hole 24, wherein each structure of the seating portion 22 and the interference-preventing groove 23 can vary according to a structure of the connector 30 applied to this transporting apparatus.

The connector 30 can connect the air bearing 20 with the carrier 40 to allow the carrier 40 to slide horizontally while keeping a rotational degree of freedom of the air bearing 20. That is, the connector 30 may include a coupling part 34 provided in an outward circumference area to be interlocked with the air bearing 20, and a supporter 32 connected to the carrier 40 and having a flexure hinge structure to limit a movement of the carrier 40 with respect to a z-axis perpendicular to x and y axes and to allow the air bearing 20 to have the rotational degrees of freedom in $\alpha$ and $\beta$-directions with respective to the x and y-axes when the air bearing 20 moves along an irregular surface of the base 10.

The coupling part 34 of the connector 30 can be formed with a plurality of through holes 35 corresponding to the screw holes 24 of the air bearing 20, and thus the air bearing 20 and the connector 30 may be firmly coupled with each other by screws 50 or the like.

The supporter 32 of the connector 30 may be a dual flexure hinge structure, which may vary as necessary, and may include a first supporter 32a and a second supporter 32b which are concentrically formed on the same surface to simplify the flexure hinge structure and lower the height of the carrier 40 relative to the base surface 10.

In the $\alpha$-direction with respect to the x-axis, the rotational degree of freedom can be controlled by a first flexure hinge 70 provided symmetrically to connect the first supporter 32a with the second supporter 32b. In the $\beta$-direction with respect to the y-axis, the rotational degree of freedom can also be controlled by a second flexure hinge 80 provided symmetrically to connect the second supporter 32b with the coupling part 34. Therefore, the first supporter 32a of the connector 30 supporting the carrier 40 does not move with respect to the z-axis even if the air bearing 20 moves with respect to the z-axis, so that a horizontal state of the carrier 40 is maintained stable.

In an aspect of the general inventive concept, the first and second flexure hinges 70 and 80 can be formed by a wire-cutting method.

The first flexure hinges 70 are disposed on a line perpendicular to a line on which the second flexure hinges 80 are disposed with respect to a central axis of a coupling protrusion 36.

The supporter 32 may include first cutout portions 70a and 70b to form the first flexure hinge 70, and second cutout portions 80a and 80b to form the second flexure hinge 80. The first cutout portions 70a and 70b and the second cutout portions 80a and 80b can be formed around the coupling protrusion 36. The first supporter 32a may be separated from the second supporter 32b along the first cutout portion 70a and 70b except the first flexure hinges 70, and the second supporter 32b may also be separated from the coupling part 34 along the second cutout portion 80a and 80b except the second flexure hinges 80.

The rotational degrees of freedom of the air bearing 20 in the in $\alpha$ and $\beta$-directions can be controlled by adjusting flexural rigidity, wherein the flexural rigidity can be adjusted by changing a space between the first and second flexure hinges 70 and 80, i.e., a thickness of the first cutout portions 70a and 70b or the second cutout portions 80a and 80b.

Further, rigidity with respect to the z-axis can be properly adjusted by adjusting the thickness of the first and second flexure hinges 70 and 80, so that the transporting apparatus can be designed according to a weight of the carrier 40 placed on the air bearing 20.

The first supporter 32a of the connector 30 can be formed with the coupling protrusion 36, and the carrier 40 can be formed with a coupling hole 46 corresponding to the coupling protrusion 36, so that the first supporter 32a and the carrier 40 are firmly coupled together. This structure is illustrated by way of example only and is not limited thereto. For example, one of the first supporter 32a of the connector 30 and the carrier 40 can be formed with the coupling protrusion 36, and the other one of the first supporter 32a of the connector 30 and the carrier 40 can be formed with the coupling hole 46 corresponding to the coupling protrusion 36. Further, the coupling structure of the connector 30 and the carrier 40 can vary as long as they are firmly coupled.

The carrier 40 can be used to transport a precision component, such as a semiconductor wafer, an LCD, etc., and it is important to keep the carrier 40 in the horizontal state because a slight shock can result in an error of inspection.

On the other hand, the carrier 40 can be connected to an actuator 60 at one end thereof and be transported by the actuator 60, wherein the actuator 60 selectively includes a well-known actuator, such as a cylinder, a ballscrew, etc.

Figure 7A:
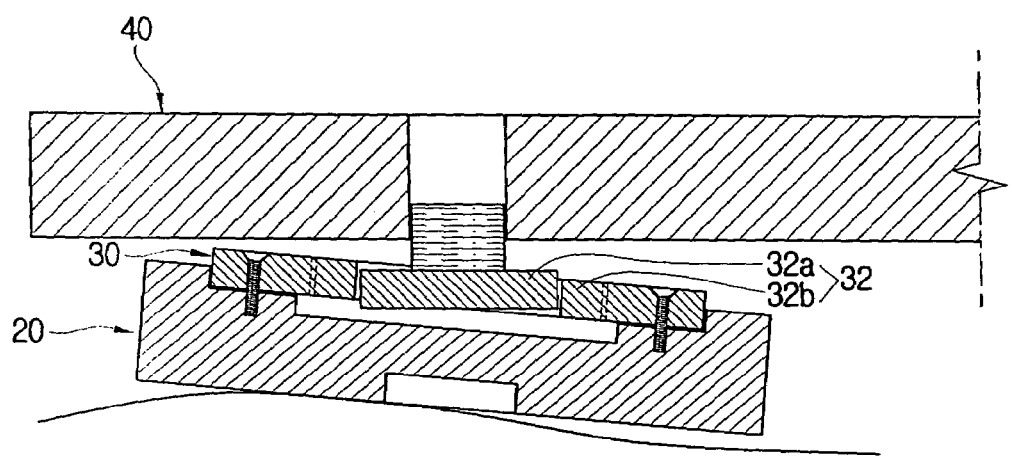
FIGS. 7A and 7B are sectional views illustrating operations of the connector while an air bearing of the transporting apparatus, according to another embodiment of the general inventive concept.
Figure 7B:
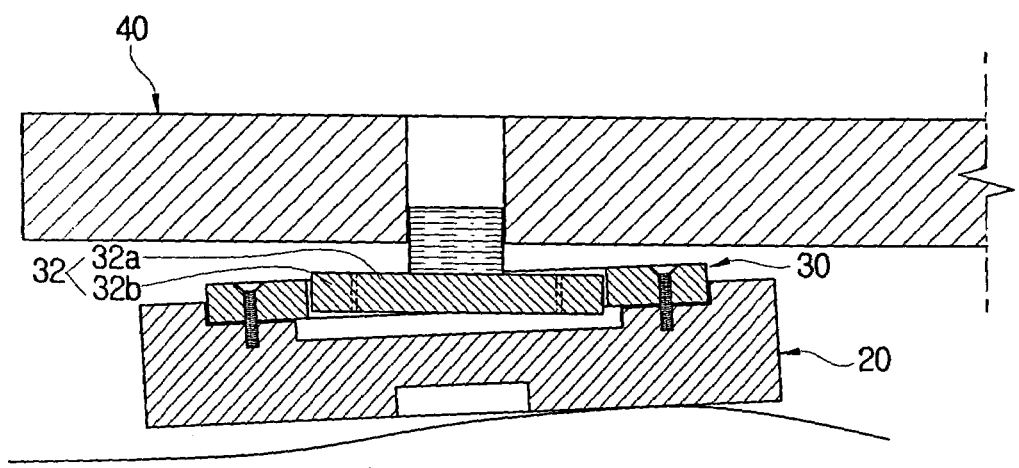

FIGS. 7A and 7B are sectional views illustrating operations of the connector 30 when the air bearing 20 of the transporting apparatus is rotated, wherein the rotated angle of the air bearing is practically minute but is exaggerated in the drawings.

As shown in FIG. 7A, in a case that the air bearing 20 rotates with respect to the x-axis, the first supporter 32a of the connector 30 to connect the air bearing 20 with the carrier 40 can be kept in the horizontal state, while the second supporter 32b and the coupling part 34 are rotated together with the air bearing 20 at a predetermined angle. Additionally, as shown in FIG. 7B, in a case that the air bearing 20 rotates with respect to the y-axis, the first supporter 32a of the connector 30 to connect the air bearing 20 with the carrier 40 and the second supporter 32b can be kept in the horizontal state, while the coupling part 34 is rotated together with the air bearing 20 at a predetermined angle.

As described above, the first supporter 32a supporting the carrier 40 can maintain the horizontal state of the carrier 40 regardless of a movement of the air bearing 20 due to the irregular surface of the base, thereby increasing the accuracy and the reliability of the transporting apparatus.

As described above, according to an aspect of the general inventive concept, a movement of an air bearing does not affect a carrier, thereby improving accuracy and reliability of a transporting apparatus.

Also, according to another aspect of the general inventive concept, it is advantageous that a height of a carrier can be lowered relative to a surface of a base.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A transporting apparatus to move a carrier along a surface of a base, comprising:
    an air bearing placed on the base; and
    a connector connected to an upper part of the air bearing and provided with a supporter at a center thereof, the supporter having a flexure hinge structure to allow the air bearing to be freely rotated relative to the base, wherein the carrier is supported by the supporter of the connector to be transported while remaining a level with respect to the surface of the base.

2. The transporting apparatus according to claim 1, wherein the supporter of the connector comprises a dual type flexure hinge structure having a first supporter and a second supporter concentrically formed on the same surface.

3. The transporting apparatus according to claim 2, wherein one of the first supporter of the connector and the carrier comprises a coupling protrusion and the other one of the first supporter of the connector and the carrier comprises a coupling hole corresponding to the coupling protrusion.

4. The transporting apparatus according to claim 3, wherein the air bearing comprises a seating portion on which the connector is placed, and the seating portion comprises an interference-preventing groove to allow the air bearing to be rotated without interfering with the supporter of the connector.

5. The transporting apparatus according to claim 2, wherein the air bearing comprises a vacuum preload type air bearing.

6. The transporting apparatus according to claim 1, further comprising an actuator connected to the carrier and transporting the carrier.

7. The transporting apparatus according to claim 1, wherein the air bearing comprises a vacuum preload type air bearing.

8. The transporting apparatus according to claim 1, wherein one of the first supporter of the connector and the carrier comprises a coupling protrusion and the other one of the first supporter of the connector and the carrier comprises a coupling hole corresponding to the coupling protrusion.

9. The transporting apparatus according to claim 8, wherein the air bearing comprises a seating portion on which the connector is placed, and the seating portion comprises an interference-preventing groove to allow the air bearing to be rotated without interfering with the supporter of the connector.

10. A transporting apparatus to move a carrier along a surface of a base, comprising:
    an air bearing to generate a layer of air so that the air bearing floats over the surface of the base; and
    a connector having a coupling part connected to the air bearing, a supporter disposed inside the coupling part to be connected to the carrier, and a flexure hinge formed between the coupling part and the support to remain a level regardless of the surface of the base.

11. The transporting apparatus according to claim 10, wherein the connector comprises a cutout portion formed between the coupling part and supporter to separate the coupling part from the supporter except at the flexure hinge.

12. The transporting apparatus according to claim 10, wherein the supporter comprises a first supporter and a second supporter, and the flexure hinge comprises a first flexure hinge formed between the first supporter and the second supporter, and a second flexure hinge formed between the second supporter and the coupling part.

13. The transporting apparatus according to claim 12, wherein the first flexure hinge is disposed to be perpendicular to the second flexure hinge with respect to a central axis of the connector.

14. The transporting apparatus according to claim 12, wherein the first flexure hinge comprises a pair of first flexure sub-hinges, the second flexure hinge comprises a pair of second flexure sub-hinges, and the first flexure sub-hinges are disposed on a line perpendicular to a line on which the second flexure sub-hinges are disposed.

15. The transporting apparatus according to claim 14, wherein the supporter further comprises first cutout portions formed between the first supporter and the second supporter, and second cutout portions formed between the second supporter and the coupling part.

16. The transporting apparatus according to claim 15, wherein the first supporter is separated from the second supporter along the first cutout portions except at the first flexure sub-hinges, and the second supporter is separated from the coupling part along the second cutout portions except at the second flexure sub-hinges.

17. The transporting apparatus according to claim 15, wherein the first cutout portions are formed between the first flexure sub-hinges, and the second cutout portions are formed between the second flexure sub-hinges.

18. The transporting apparatus according to claim 15, wherein the first cutout portions are separated from each other in a circumferential direction of a central axis of the connector.

19. The transporting apparatus according to claim 15, wherein the first support, the second support, and the coupling part are disposed in a radial direction of a central axis of the connector in order.

20. The transporting apparatus according to claim 15, wherein the air bearing comprises a seating portion to be coupled to the coupling part of the connector, and an interference-preventing groove formed within the seating portion to correspond to the first and second supporters so that the first and second supporters move freely within the interference-preventing groove.

* * * * *